May 23, 1939.  C. W. JOHNSON  2,159,162
TAP HOLDER CHUCK
Filed July 29, 1936
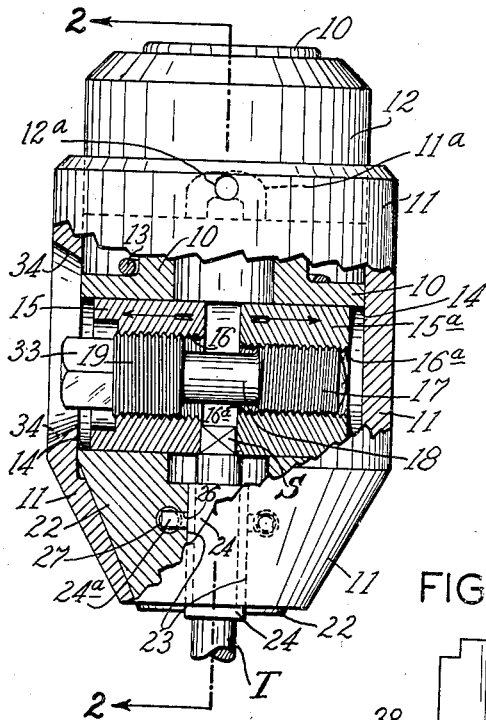
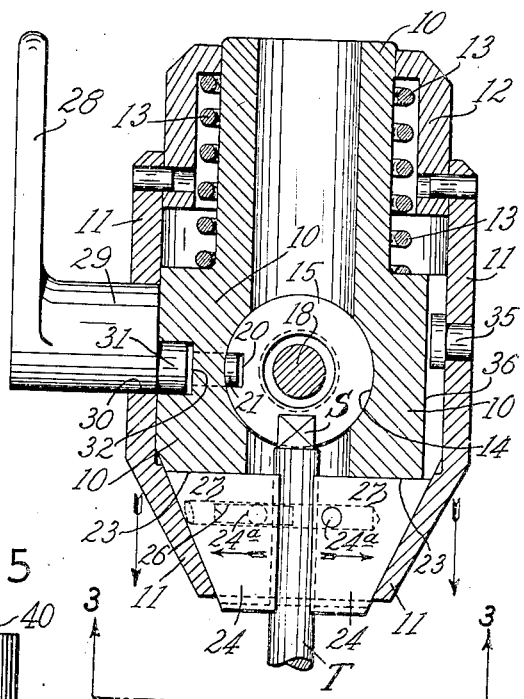
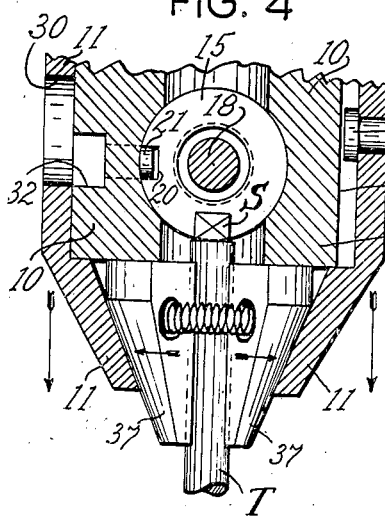
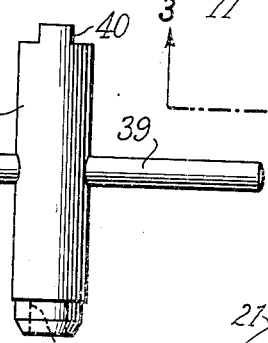
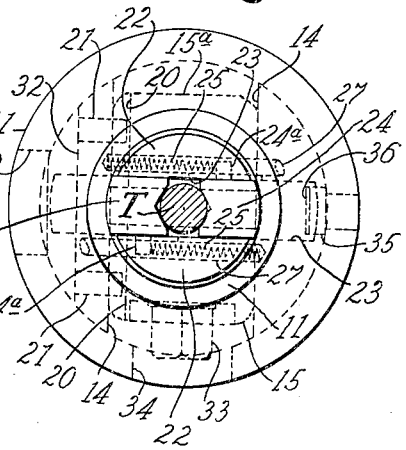
INVENTOR
Carl W. Johnson
BY George S. Hastings
ATTORNEY Patented May 23, 1939

2,159,162

UNITED STATES PATENT OFFICE 2,159,162

TAP HOLDER CHUCK

Carl W. Johnson, Brooklyn, N. Y., assignor to American Machine & Foundry Company, a corporation of New Jersey Application July 29, 1936, Serial No. 93,180

7 Claims. (Cl. 279—66)

This invention relates to a chuck device, and more particularly to a tap holder chuck.

In devices of this type it is usually desirable to provide means which allow a tap, or other tool to be quickly inserted and removed from the chuck in order that a minimum of time may be consumed in change of tool. In prior devices it has been customary to use screw threaded members for adjusting the centralizing elements or gripping jaws which bear upon the shanks of these tools. It is obvious that with this kind of a structure it is not possible to effect an extremely rapid change of tool because of the necessity of screwing parts thereof into proper position.

In order to overcome these disadvantages in the chuck of the present invention threaded members for adjusting the centralizing elements have been eliminated. The net result of this change is that it is now possible to expeditiously and automatically center a tap or drill in the chuck by one simple movement of a controlling member.

It is the main object of this invention to provide a chuck having means for automatically centralizing the gripping jaws thereof.

It is a further object of the invention to provide a chuck in which adjustable jaws are furnished for gripping the squared end of a tap or like tool, and mechanism for automatically centralizing said tap within said chuck.

This invention also contemplates the use of a device for operating both the jaws which grip the squared end of a tool and those which centralize and secure the shank portion thereof in the chuck. It is therefore an additional object to provide a single tool for operating the several sets of jaws in said chuck.

A further object of this invention is to eliminate the threaded members customarily used in adjusting the centralizing jaws of a chuck to gripping and centralizing position by the provision of relatively slidable members which hold said jaws in normally closed position.

With these and other objects not specifically mentioned in view, the invention consists of the combinations and constructions which will be hereinafter fully described, and then set forth specifically in the appended claims.

In the accompanying drawing:

Fig. 1 is a side elevation, partly shown in section, of the improved tap holder chuck;

Fig. 2 is a sectional side elevation of the same, taken on line 2—2 of Fig. 1;

Fig. 3 is a plan view of the same taken on line 3—3 of Fig. 2;

Fig. 4 is a partial sectional side elevation of the improved tap holder chuck in combination with a modified form of centering jaws;

Fig. 5 is a side elevation of a suitable chuck operating key, and

Fig. 6 is an end view of the key.

Referring to the drawing, the improved tap holder chuck consists of a body 10 surrounded by a shell 11 carrying a removable cap 12. Shell 11 is urged upwardly with respect to the lower portion of body 10 by a spring 13 located between said portion and cap 12. Shell 11 is provided with removable pins 12$^a$ which project into bayonet slots 11$^a$ in cap 12 and allow easy removal of said cap from the assembly. Body 10 is provided with a transverse hole 14 in which is slidably mounted a pair of clamping jaws 15 and 15$^a$. The latter is provided with a left hand threaded hole 16$^a$ which engages with a left hand threaded portion 17 of an operating stud 18. A right hand threaded portion 19 of said stud engages with a right hand threaded hole 16 of jaw 15. By turning stud 18, jaws 15 and 15$^a$, of course, move towards or away form each other. In order to prevent jaws 15 and 15$^a$ from turning within transverse hole 14 during operation, each jaw is provided with a longitudinal key way 20 into each of which projects a pin 21 held by the body 10. The lower portion 22 of the latter is provided with a transverse slot 23 (Figs. 1, 2 and 3) in which is slidably supported a pair of centering jaws 24, the outer ends of which are always pressed against the conical inner walls of the lower portion of shell 11 by means of springs 25 (Fig. 3), each of which engages with a pin 24$^a$ attached to each of the jaws 24. Each spring 25 is mounted in a hole 27 of the lower portion 22 of body 10 and each pin 24$^a$ projects into the corresponding hole 27 through a slot 26. The constant pressure of each of said springs against its corresponding pin assures a steady contact of the outer ends of said jaws against the conical inner surface of the lower portion of shell 11. As spring 13 has the tendency to keep shell 11 in its uppermost position at all times, jaws 24, by means of the conical shape of the lower portion of the shell 11 contacting said jaws, are forced towards the center of the chuck. In order to facilitate the mounting of a tap into the improved chuck, a special eccentric lifter tool 28 (Fig. 2) is employed. The hub 29 of said tool is inserted in a hole 30 of shell 11, thereby causing the eccentrically mounted pin 31 on hub 29 to engage with a key way or shoulder 32 in body 10. The handle of tool 28 is then moved in either direction thereby causing shell 11 to be moved to a downward position, effecting a compression of spring 13 mounted between shell 11 and body 10. The downward movement of shell 11 causes jaws 24, riding against the inner walls of the conical bottom portion of said shell and under the influence of springs 25 to open and tap T may be inserted. After the latter is placed between said open jaws 24, tool 28 is moved or released, jaws 24 center the shank of said tap T as the spring 13 forces shell 11 to move upward again and thereby closes said jaws. The shank ends of all taps are provided with a square end S by means of which all taps are driven. When inserting a tap into said chuck, said square end S reaches between the clamping jaws 15 and 15a which, have been opened wide enough for that purpose before inserting the tap. Said clamping jaws are then closed, gripping the square end S tightly between them. Clamping jaws 15 and 15a are operated by means of a standard wrench (not shown) which is applied to the square end portion 33 of operating stud 18. Said square end portion 33 can be reached through an elongated slot 34 in shell 11. By turning the operating stud 18 in a clockwise direction, jaws 15 and 15a move towards each other and grip the square end S of tap T. By turning said stud in the opposite direction, jaws 15 and 15a, of course, open and thereby release the square end of said tap.

In order to prevent shell 11 from turning during operation, said shell is provided with a pin 35 which engages with a longitudinal key way 36 of body 10.

Instead of using a pair of centering jaws 24 positioned in the lower portion of body 10, said lower portion may be modified and said centering jaws 24 replaced by means of a set of floating centering jaws 37, as illustrated in Fig. 4. The latter, of course, are spring mounted and are operated in the same manner as jaws 24.

As an alternate form of chuck operating means I use a key having a rod portion 38, and an operating handle 39 extending therethrough at right angles to said body. At one end of the key I provide an operating pin 40, here shown eccentrically positioned, which coacts with shoulder 32. At the other end is a wrench which is used for adjusting jaws 15, 15a to proper gripping position.

While the forms of apparatus herein shown and described, constitute preferred embodiment of the invention, it is to be understood that various changes may be made in the structural details of the device without departing from the spirit and scope of the invention as set forth in the claims appended hereunto.

What is claimed is:

1. A chuck device comprising a shell having a top and tapered end, a body member slidably mounted within and shell, a plurality of jaws located within said shell and adapted to cooperate with the walls of said end, springs normally urging said jaws to open position, a yielding element of a higher resilient value than said springs positioned between said top and member and forcing said jaws by contact with said end into closed position, said member having a portion thereof formed for receiving a device adapted to move said member relative to said shell to effect an opening of said jaws, by overcoming the bias of said yielding member and permitting the bias of said springs to become effective.

2. In a chuck device, a cylindrical casing having an end closure, an end with tapered walls and a side opening, a cylindrical body member slidable within said casing, said member having a slot in the face thereof adjacent said opening, and two parallel end extensions with tapered outer faces, a pair of opposed jaws located for radial movement within said extensions, means normally urging said jaws into contact with said tapered walls, a spring located between said closure and member for holding said jaws by contact with said walls in closed position, and means insertible through said opening into said slot for imparting relative movement to said casing and member to compress said spring whereby the jaws can move to open tool receiving position.

3. In a chuck, a tubular body member adapted to be mounted for rotation on a rotatable spindle, provided on its outer face with a keyway parallel to its longitudinal axis and a shoulder, a tubular casing having an end with tapered end walls and an end closure enclosing said member, a key projecting from said casing into said keyway for preventing relative rotary movement between said member and casing, a plurality of jaws mounted between said body member and end walls, said jaws being normally yieldingly held in closed position against said walls, said casing also having an opening adjacent said shoulder, and so arranged with respect thereto that a device may be inserted through the opening and cooperate with said shoulder for moving said member relative to said shell for opening said jaws.

4. In a chuck, a body member provided with a longitudinal and a transverse bore, a pair of threaded gripping devices located for movement in said transverse bore, a multiple threaded rod for moving said devices to and from each other to grip the end of a tool, a casing provided with a tapered end surrounding said body member, means for urging said member and casing apart axially, movable jaws located beneath said member and bearing against the walls of said tapered end, and means adapted to be inserted through an opening in said casing and cooperating with said member for moving said casing relative to said member to separate the outer faces of the jaws from said walls, whereby the former may open to tool receiving position, said outer element being formed in one piece from end to end and tapering at its forward end into the form of a nozzle embracing the jaws and drill, said chuck being free from outwardly presented parts capable of rotation relatively to each other.

5. A chuck comprising an outer shell having a top portion and inwardly tapered end walls, a body member movably mounted in said shell, said member having formed therein a transverse bore, a pair of adjustable gripping devices located in said bore, said gripping devices being movable bodily with said member axially of said shell, a plurality of jaws located between said member and tapered end walls, and a yielding element positioned between said top portion and member for forcing said jaws by contact with said end into closed position.

6. In a chuck for taps or other tools having squared ends and cylindrical shanks comprising a rotatable body provided with an opening extending transversely of the axis of rotation of the body, a pair of adjustable threaded gripping devices arranged in said opening to grip and positively drive the square at the end of the tap, tap centering jaws arranged to engage and center the shank of a tap having its square engaged by said gripping devices, means normally urging said jaws into tool-centering and aligning engagement with the shank of said tap, said means including a spring pressed sleeve axially movable relatively to said jaws and having a conical surface engaging the taper of said jaws to press the same into tool-centering engagement with the shank of said tap, and spring devices of less strength than said sleeve pressing spring urging said jaws apart to release the tool shank, said means and spring devices being so constructed and arranged that axial movement without rotation of said conical surfaced member relatively to said jaws against said spring pressure will free the shank of the tool, and release of said member to act under said spring pressure will automatically cause the jaws to grip and center the tool shank, whereby taps of different shank size may be quickly interchanged by said relative axial movement of said member and jaws.

7. In a chuck for taps or other tools having squared ends and cylindrical shanks comprising a rotatable body provided with an opening extending transversely of the axis of rotation of the body, a pair of adjustable threaded gripping devices arranged in said opening to grip and positively drive the square at the end of the tap, tap centering jaws tapering inwardly and downwardly toward the working end of a tool therein arranged to engage and center the shank of a tap having its square engaged by said gripping devices, means normally urging said jaws into tool-centering and aligning engagement with the shank of said tap, said means including a spring pressed sleeve axially movable relative to said jaws and having a conical end both tapering downwardly and inwardly toward said tool end and having an inner conical surface engaging the taper of said jaws to press the same into tool-centering engagement with the shank of said tap, and spring devices of less strength than said sleeve pressing spring urging said jaws apart to release the tool shank, said means and spring devices being so constructed and arranged that axial movement without rotation of said conical surfaced member relatively to said jaws against said spring pressure will free the shank of the tool, and release of said member to act under said spring pressure will automatically cause the jaws to grip and center the tool shank, whereby taps of different shank size may be quickly interchanged by said relative axial movement of said member and jaws.

CARL W. JOHNSON.